US006571202B1

(12) United States Patent
Loman et al.

(10) Patent No.: US 6,571,202 B1
(45) Date of Patent: May 27, 2003

(54) METHOD FOR APPLYING DESIGN FOR RELIABILITY INTO DESIGN FOR SIX SIGMA

(75) Inventors: James Mark Loman, Saratoga Springs, NY (US); Necip Doganaksoy, Clifton Park, NY (US); Gerald John Hahn, Schenectady, NY (US); Thomas Anthony Hauer, West Chester, OH (US); Omar Aquib Hasan, Scotia, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 09/378,944

(22) Filed: Aug. 23, 1999

Related U.S. Application Data

(60) Provisional application No. 60/124,839, filed on Mar. 17, 1999.

(51) Int. Cl.$^7$ ............................ G06F 7/60; G06F 17/10; G06F 101/00
(52) U.S. Cl. ............................ 703/2; 703/7; 703/22; 702/34; 700/108
(58) Field of Search .............................. 703/1–2, 6–22; 702/34; 700/95–110

(56) References Cited

U.S. PATENT DOCUMENTS

| | | | |
|---|---|---|---|
| 5,301,118 A | | 4/1994 | Heck et al. ................. 700/109 |
| 5,418,931 A | * | 5/1995 | Moorby ....................... 703/19 |
| 5,452,218 A | | 9/1995 | Tucker et al. .............. 700/110 |
| 5,539,652 A | * | 7/1996 | Tegethoff ................... 700/108 |
| 5,581,466 A | | 12/1996 | Van Wyk et al. ............ 700/95 |
| 5,956,251 A | * | 9/1999 | Atkinson et al. ........... 700/109 |
| 6,226,597 B1 | * | 5/2001 | Eastman et al. ............ 702/34 |
| 6,253,115 B1 | * | 6/2001 | Martin et al. ............... 700/97 |

OTHER PUBLICATIONS

Chen et al, "A Procedure for Robust Design: Minimizing Variations Caused by Noise Factors and Control Factors", Journal of Mechanical Design, Transactions of the ASME, vol. 118 No. 4, pp. 479–489 (1996).*

Hsieh et al, "A Framework of Integrated Reliability Demonstration in System Development", IEEE Proceedings of the Reliability and Maintainability Symposium, pp. 258–264 (Jan. 1999).*

Thomas et al, "Devising a Test Strategy to Characterize System Reliability of Submicron Interconnect Wiring", IEEE Third International Workshop on Statistical Metrology, pp. 82–87 (Jun. 1998).*

Smith et al, "Worst Case Circuit Analysis—An Overview (Electronic Parts/Circuits Tolerance Analysis)", 1996 IEEE Proceeding of Reliability and Maintainability Symposium, pp. 326–334 (Jan. 1996).*

Hasnat et al, "A Manufacturing Sensitivity Analysis of 0.35 $\mu$m LDD MOSFET's", IEEE Transactions on Semiconductor Manufacturing, vol. 7 Issue 1, pp. 53–59 (Feb. 1994).*

MJ Harry, "The Vision of Six Sigma: A Roadmap for Breakthrough", Sigma Publishing Co., 1994, pp. 2.2–2.8, 10.17–10.21, 22.18–22.20.

W. Nelson, "Accelerated Testing: Statistical Models, Test Plans, And Data Analyses", 1990, pp. 1–53.

GJ Hahn, et al, "Statistical Models in Engineering", John Wiley & Sons, Inc., 1967, pp. 236–257.

* cited by examiner

*Primary Examiner*—Samuel Broda

(57) ABSTRACT

A method for applying design for reliability into design for Six Sigma is described. The method includes establishing an appropriate model for reliability as a function of time; determining a reliability transfer function; calculating defects per opportunity per unit of time; entering said defects per opportunity per unit of time into a calculation of value of sigma; selecting one or more noise factors likely to have an impact on reliability; and performing a closed form analytical solution of said impact on reliability using a Monte Carlo analysis. The noise parameters may include one or more assumptions of the hours of usage per year, temperature of use, material quality, part quality, layout of components, extrinsic stresses, supplier quality, interconnection quality, test coverage, shipping damage, installation errors, errors in instructions, customer misuse or other noise factors beyond the control of the designer.

20 Claims, 5 Drawing Sheets

METHOD FOR APPLYING DESIGN FOR RELIABILITY INTO DESIGN FOR SIX SIGMA

This application claims the benefit of U.S. Provisional Application No. 60/124,839, filed Mar. 17, 1999.

BACKGROUND OF THE INVENTION

The invention relates to a method for applying design for reliability into design for Six Sigma.

Defect levels in the design and manufacturing of products must be kept as low as possible. One measure of defect levels is "Six Sigma" engineering and manufacturing. Under the "Six Sigma" paradigm defect levels are kept below 3.4 parts per million. This means that at least 999,996.6 out of every million opportunities must be completed successfully within specification.

Meeting the demands of the "Six Sigma" paradigm requires a concurrent design and manufacturing engineering that achieves robust product design and manufacturing processes. The product design must be robust to natural sources of variation, and the manufacturing process must implement process controls that keep manufacturing within specification.

Creation of designs and processes that synergistically interact to meet "Six Sigma" requirements are described, for example, in Mikel J. Harry, *The Vision of Six Sigma: A Roadmap for Breakthrough*, Sigma Publishing Co., 1994. One early application of "Six Sigma" was in mechanical tolerancing. Mechanical tolerancing is the determination of the zone over which the individual component mechanical parameters of the components in an assembly can fluctuate from the nominal values thereof and still yield an acceptable assembly.

Six sigma design techniques are now available for design and production processes. Analogous procedures for reliability during customer or field use are needed. What is different about reliability (quality over time) is that data often involve time to failure rather than part measurements. Weibull, exponential and/or lognormal distributions (or more complex models) for time to failure are generally required in place of the normal distribution. Data often include runouts (units which have not failed). Current design for Six Sigma techniques include methods for handling parts, processes, performance, and software, but provide no method for handling reliability. There is a need for a process that closes this gap and allows reliability to be included in Six Sigma engineering projects.

The use of Monte Carlo Analysis in component tolerancing is described in, for example, Gerald J. Hahn & Samuel S. Shapiro, Statistical Models in Engineering, John Wiley and Sons, Inc., 1967, pages 236–257.

Monte Carlo analysis is performed by first establishing a range for each individual component tolerance, for example a range of Upper Specification Limit-Lower Specification Limit (USL-LSL). Then a random sampling fitting a mathematically defined distribution is taken from within this range, and the response evaluated. The output values are analyzed by traditional statistical methods.

Monte Carlo analysis uses a random number generator to perform the distribution sampling. Therefore, Monte Carlo simulation can simulate large sample sizes on digital computers. Monte Carlo analysis is especially useful where complex assemblies can not be readily or realistically analyzed by linear methods as root-sum-of-squares analysis or worst case analysis. Monte Carlo analysis is also useful where the completed assemblies are costly or time consuming to manufacture.

Monte Carlo techniques and the Six Sigma paradigm are disclosed in U.S. Pat. No. 5,301,118 issued on Apr. 5, 1994 to Heck et al.

SUMMARY OF THE INVENTION

A method for applying design for reliability into design for Six Sigma is described. The method includes establishing an appropriate model for reliability as a function of time; determining a reliability transfer function; calculating defects per opportunity per unit of time; entering said defects per opportunity per unit of time into a calculation of value of sigma; selecting one or more noise factors likely to have an impact on reliability; and performing either a closed form analytical solution of said impact on reliability or using a Monte Carlo analysis to determine the impact.

A storage medium is encoded with machine-readable computer program for applying design for reliability into design for Six Sigma method described above. The storage medium includes instructions for causing a computer to implement the method.

These and other features and advantages of the present invention will be apparent from the following brief description of the drawings, detailed description, and appended claims and drawings.

BRIEF DESCRIPTION OF THE DRAWINGS

The invention will be further described in connection with the accompanying drawings in which.

DESCRIPTION OF INVENTION

An exemplary embodiment of the invention is an engineering process to incorporate reliability into a Six Sigma framework. The process is outlined as follows. A first step is to establish the appropriate model for reliability as a function of time. This is designated R(t). The procedure can also be applied to other similar reliability type functions, such as service call rate, or availability. Methods for determining reliability are well known, for example through accelerated tests, per calculations based on military handbooks, or through standard techniques such the Bellcore Reliability model (TR-332). The teachings of accelerated testing are available in a treatise on the subject by Wayne Nelson entitled "Accelerated Testing: Statistical Models, Test Plans, and Data Analysis."

A second step is to determine the reliability transfer function. The reliability transfer function is the function that relates the system control parameters (henceforth called X's) to the reliability as a function of time (R(t)=Y). The unreliability as a function of time is typically a Weibull distribution, exponential distribution, log-normal distribution, mixed Weibull distribution, gamma distribution, or other parametric or non-parametric model. Electronic components and systems often use an exponential transfer function whereas mechanical components or systems use a Weibull or log-normal distribution.

A third step is to then calculate the "Defects Per Opportunity per Unit Time." Defects are based on the unreliability, defined as equal to "1−reliability"; e.g., 0.99 reliability is equal to 0.01 unreliability. An opportunity is each item subject to possible failure.

Figure 1:
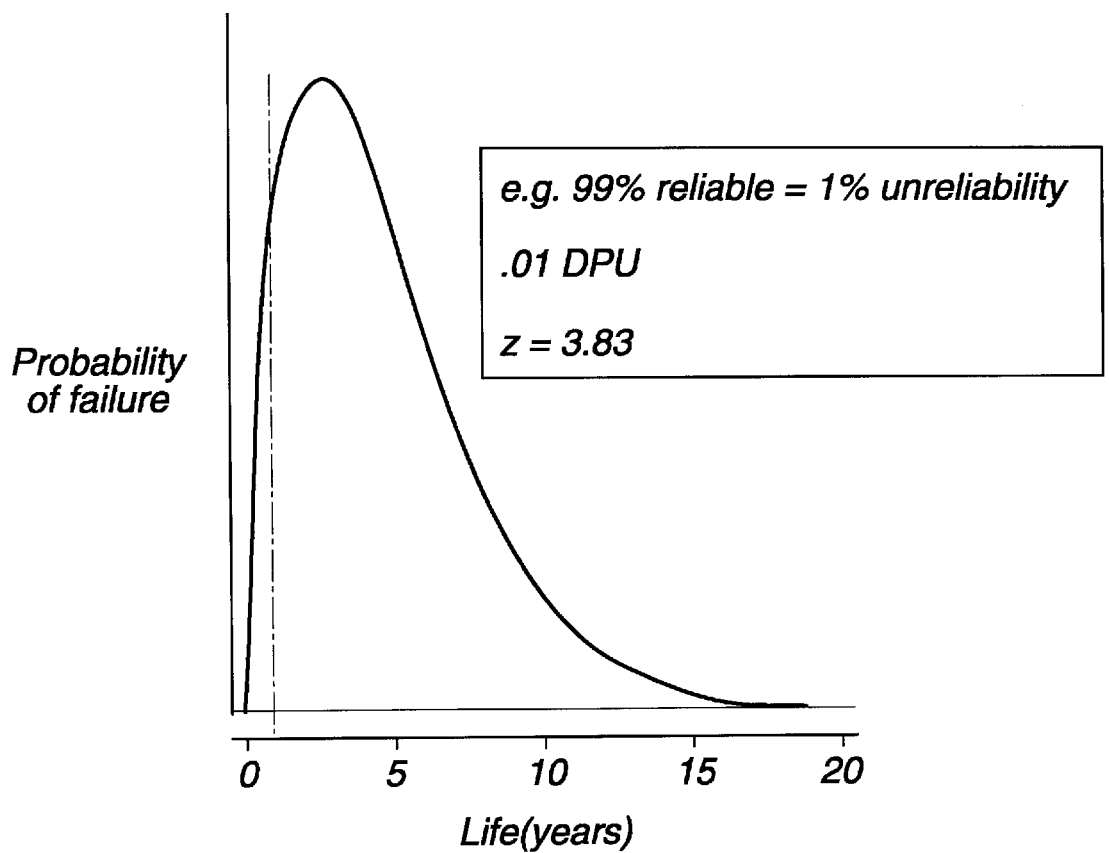
FIG. 1 illustrates an example of how to calculate a Z value based on reliability.

If no defects by a specified time $T_o$ allowed for a specified set of operational conditions (or values of all transfer functions) is the goal, then this is entered as a Defect Per Unit (DPU) or a Defect Per Million Opportunities DPMO into the calculation for sigma or Z value. In particular, the process determines from the reliability function the probability of no failure occurring by time $T_o$ (at the specified set of operational conditions), and then translates this probability into a normal distribution Z value. The normal distribution is used here to achieve comparability with other Six Sigma estimates. The method to do this is illustrated in FIG. 1. Curve 10 in FIG. 1 illustrates how to calculate Z value based on unreliability, assuming "perfect" reliability is desired. Reliability is defined as no failure by time $T_0$. In the example in FIG. 1, $T_0$ is assumed to be one year.

If there is a reliability goal, e.g. $R \geq 0.984$, then an estimate of noise factors is required to estimate the likelihood that the reliability target is not met. Frequently, there are noise factors that impact the reliability of a particular unit. This impact may vary from unit to unit. The noise factors are parameters beyond the control of the designer, but that nonetheless affect the reliability. These noise factors may be varied to come up with a quantification of the uncertainty associated with the reliability estimate for a particular unit due to the noise factors. This may be accomplished through closed form analytical solutions, although in most cases Monte Carlo simulation is the most effective way to determine the distribution. This uncertainty, due to noise factors, in the probability that a reliability goal is not met is entered as the defect per unit (DPU) or Defect Per Million Opportunities (DPMO) in a calculation for sigma or Z value.

Figure 2:
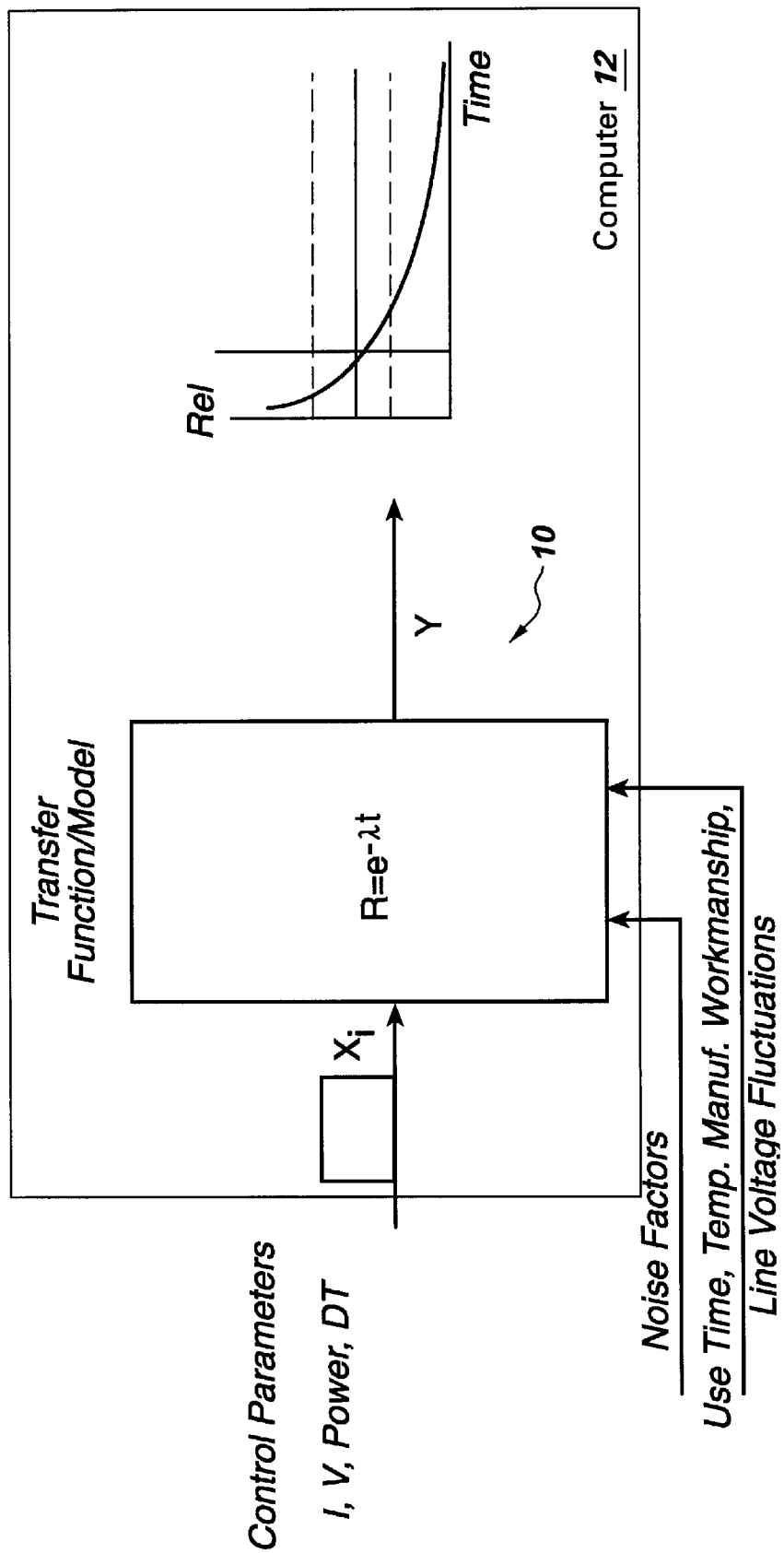
FIG. 2 illustrates an example applying the preferred embodiment to an electronic system.

An example of the approach is shown in FIG. 2. This example is for an electrical system. The control parameters, those attributes that are under the control of the designer, are the current (I), the voltage (V), the power (P) and the temperature rise above ambient (DT). The noise parameters are those that are beyond the control of the designer. As an example the noise parameters may be time (the hours of usage per year) and temperature (ambient temperature of the assembly), both of which are in the hands of the end user, and manufacturing quality, which is in the hands of various contract manufacturers. Other noise factors that may be included, but are not limited to, are one or more assumptions of material quality, part quality, layout of components, extrinsic stresses, supplier quality, interconnection quality, test coverage, shipping damage, installation errors, errors in instructions, customer misuse or other noise factors beyond the control of the designer.

The reliability transfer function is $R=e^{-\lambda(I,V,P)t}$ where $\lambda(I,V,P)$=failure rate (failure per unit of time, e.g. hour) transfer function and t=total time (hours). The reliability transfer function provides the estimated reliability, at time T0 (for a specified set of conditions in the transfer function), indicated by the intersecting solid lines, A and B. This estimate may not match actual field performance due to the "noise factors", e.g., customer environments and manufacturing variation. The effects of the noise factors for a particular unit may be to either increase the reliability at the time T0, as shown in the upper dashed line B1, or to decrease reliability at time T0, as indicated by the lower dashed line B2. For example, a customer who uses the electronic product only occasionally in an air conditioned office in New York will usually have fewer failures than will a different customer who uses it in a tin roofed enclosure without air conditioning on an oil well in the Middle East.

The next step in the process is to add the noise factors, which while not known precisely may be known within a given range or within a given distribution. One set of examples of the variation of parameters is given in FIGS. 3 and 4. In this example the time of use is distributed uniformly (between 5834 and 8760 hours per year) and the manufacturing quality affects the failure rate linearly, centered at some medium value (1.77 failures per million hours).

Figure 3:
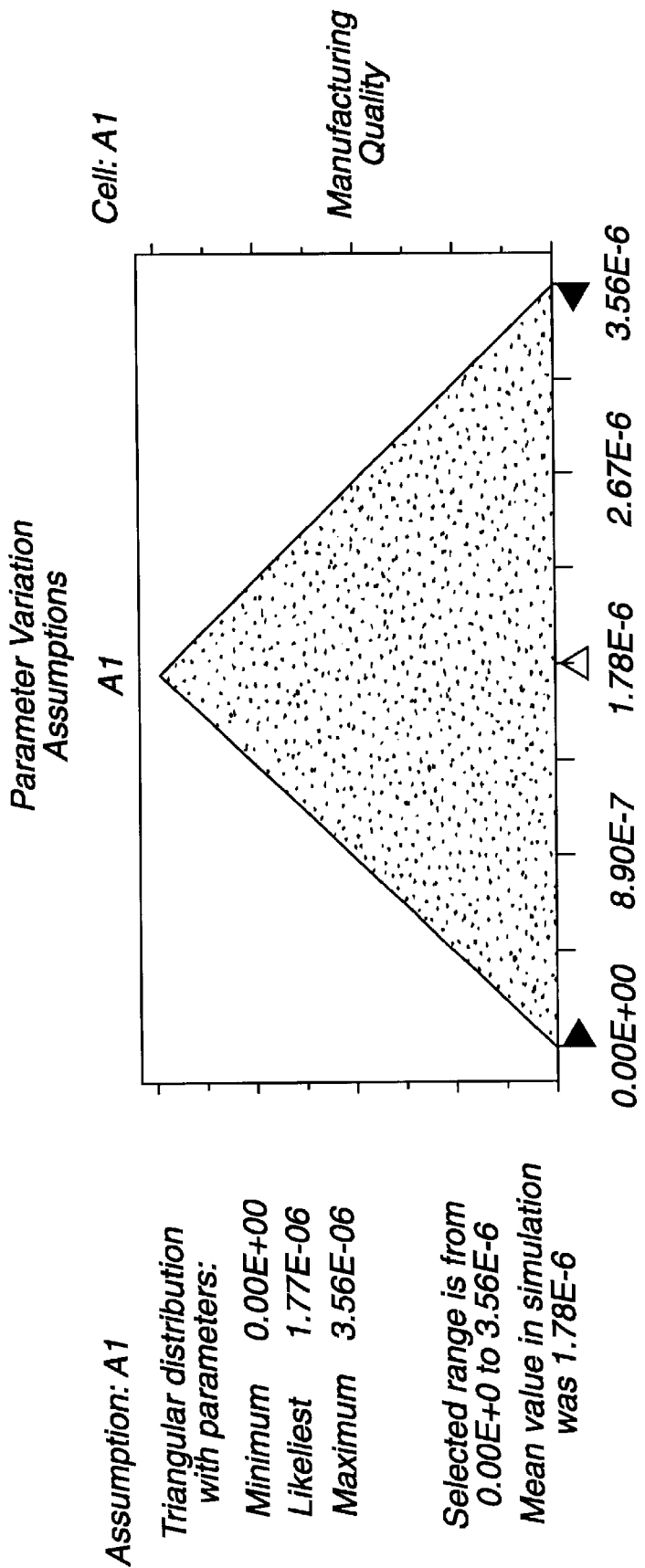
FIG. 3 illustrates a manufacturing quality assumption using a triangular distribution.
Figure 4:
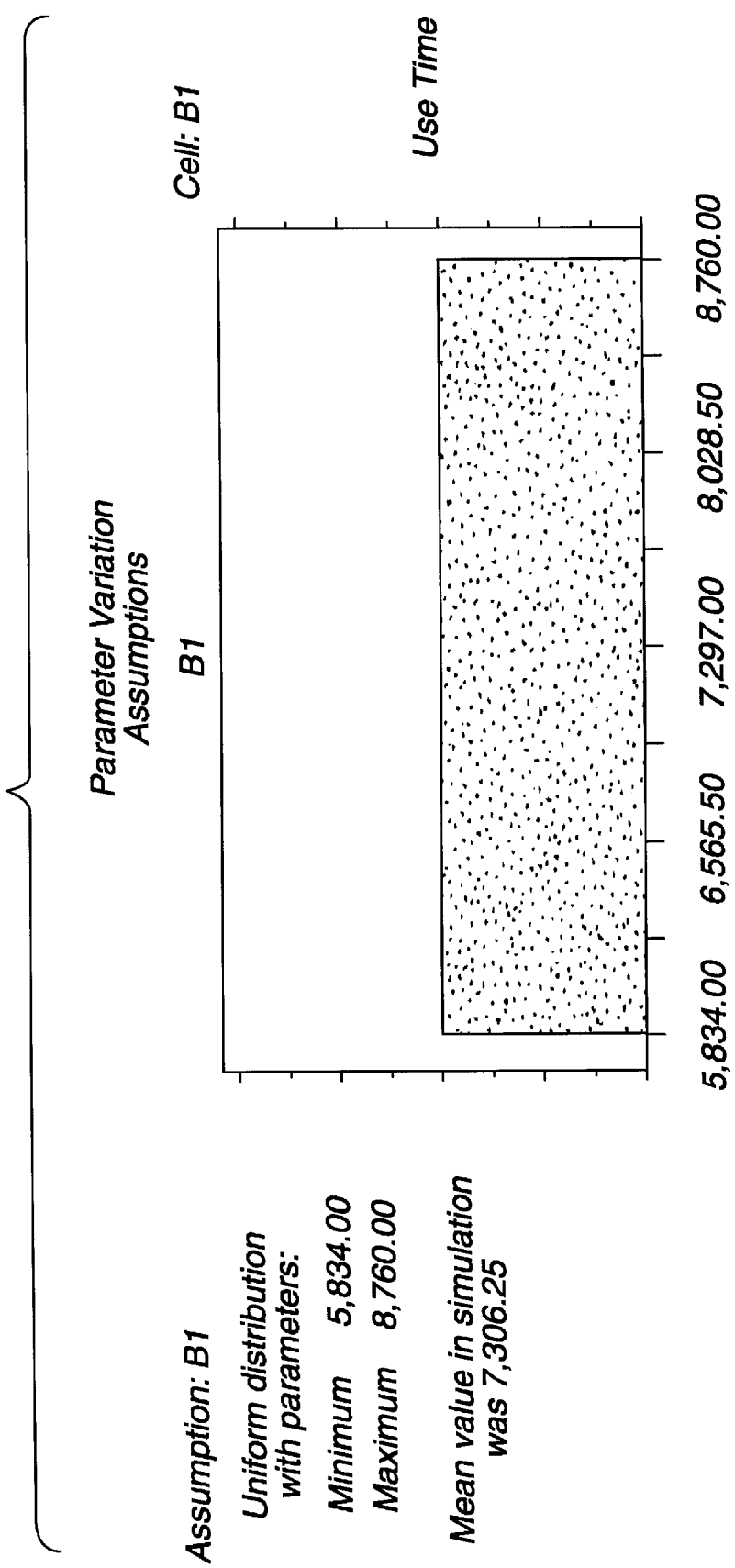
FIG. 4 illustrates a use time assumption using a uniform distribution.

The failure rate $\lambda$ is varied from 0 to $3.56 \times 10^{-6}$ failure per hour, with a most likely rate of $1.77 \times 10^{-6}$ failures per hour, based on the manufacturing quality shown in FIG. 3, and the use time (hours per year) from 5834 to 8760, with a flat distribution shown in FIG. 4. When entered into a Monte Carlo simulation tool, the reliability prediction ceases being a single value, but becomes a distribution, as shown in FIG. 5.

Figure 5:
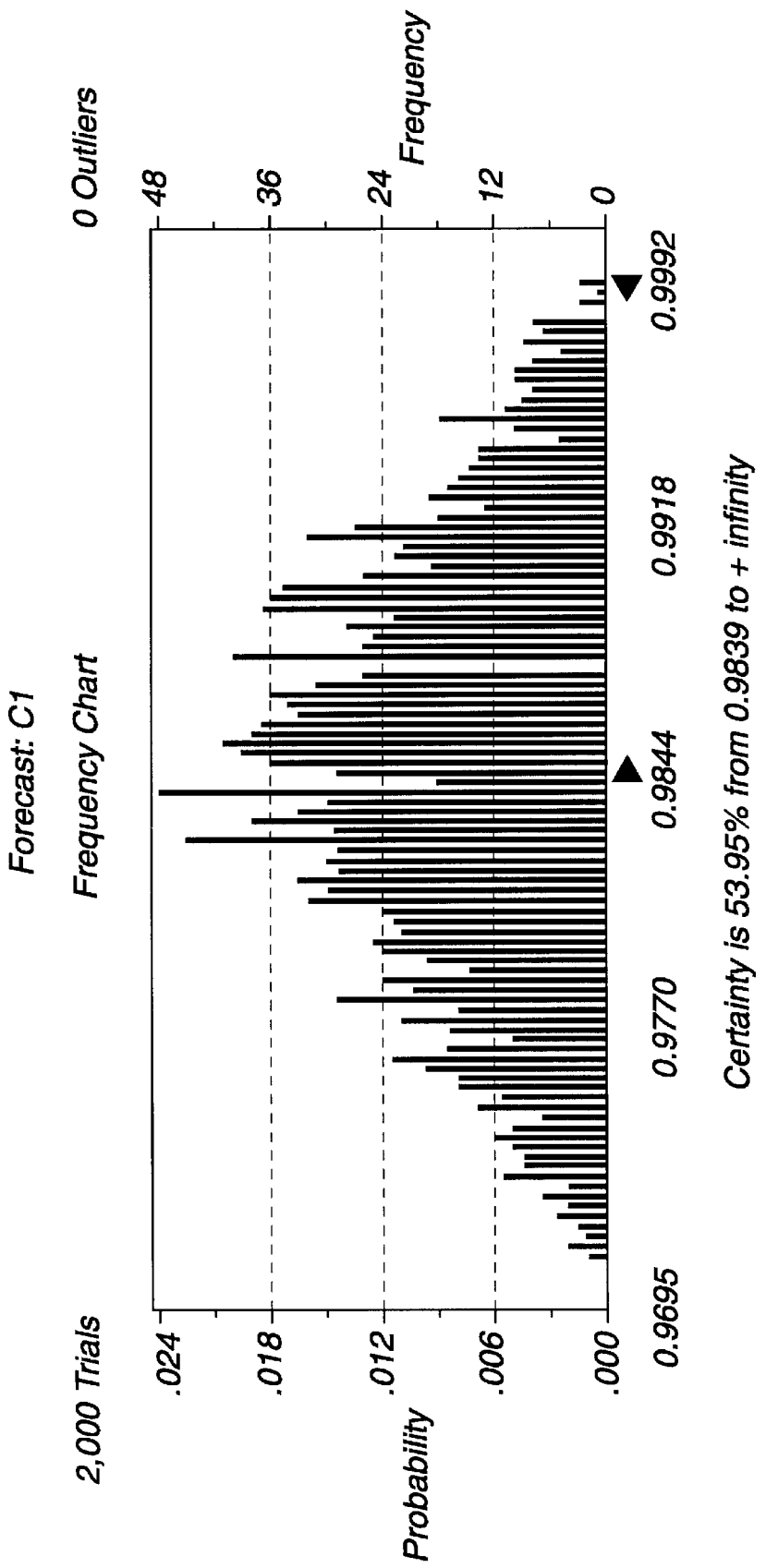
FIG. 5 illustrates a Monte Carlo calculation of the effect of noise parameters on reliability including the distributions shown in FIGS. 3 and 4.

In particular, FIG. 5 shows the statistical distribution of the probability of survival by time $T_0=1$ year as a consequence of the noise factors. In the example, a reliability of 0.984 was desired, and the proportion of units for which the reliability meets or exceeds the desired requirement is 54%. The likelihood that it does not meet is 0.46 which is then transformed to a Z value of 1.60.

In this example, despite the high reliability of 0.984, the low Z value is an indication that the reliability is inadequate. Therefore, the program would need to improve the overall Z in order to increase customer satisfaction. Improvement can be accomplished by reducing "noise parameters" (e.g., manufacturing variation) or by further increasing the reliability to a higher value (e.g., significantly higher than 0.984 in this example).

Reliability attributes are typically considered long term numbers and are not inflated by an additional 1.5 sigma (or other value) by mean shifting to avoid inflating what is already a long term estimate. In those cases where it is shown that certain attributes affect reliability, such as manufacturing variations, then those variations are considered in the Monte Carlo Analysis, again avoiding the need for additional inflation of mean value shifting.

The present invention can be embodied in the form of computer-implemented processes and apparatuses for practicing those processes. The present invention can also be embodied in the form of computer program code containing instructions embodied in tangible media, such as floppy diskettes, CD-ROMs, hard drives, or any other computer-readable storage medium 10, wherein, when the computer program code is loaded into and executed by a computer 12, the computer becomes an apparatus for practicing the invention. The present invention can also be embodied in the form of computer program code, for example, whether stored in a storage medium 10, loaded into and/or executed by a computer 12, . . . or transmitted over some transmission medium, such as over electrical wiring or cabling, through fiber optics, or via electromagnetic radiation, wherein, when the computer program code is loaded into and executed by a computer 12, the computer becomes an apparatus for practicing the invention. When implemented on a general-purpose microprocessor, the computer program code segments configure the microprocessor to create specific logic circuits.

What is claimed is:

1. A method for applying design for reliability into design for Six Sigma for use in a manufacturing process, said method comprising:

establishing a model for reliability as a function of time;

determining a reliability transfer function;

calculating defects per opportunity per unit of time;

entering said defects per opportunity per unit of time into a calculation of value of sigma;

selecting one or more noise factors likely to have an impact on reliability;

performing a Monte Carlo simulation of said impact on reliability; and using said simulation to adjust said manufacturing process.

2. The method of claim 1, wherein said transfer function is an exponential distribution.

3. The method of claim 1, wherein said transfer function is a Weibull distribution.

4. The method of claim 1, wherein said transfer function is a log-normal distribution.

5. The method of claim 1, wherein a goal of defects per opportunity is entered as the calculated value of defects per opportunity per unit of time.

6. The method of claim 1, wherein said noise factors include an assumption about time of use.

7. The method of claim 1, wherein said noise factors include an assumption about manufacturing quality.

8. The method of claim 1, wherein said noise factors include an assumption about ambient operating temperature.

9. The method of claim 1, wherein said noise factors include an assumption about climatic conditions of use.

10. The method of claim 1, wherein said noise factors may include one or more assumptions of material quality, part quality, layout of components, extrinsic stresses, supplier quality, component preparation quality, component installation quality, system assembly quality, interconnection quality, test coverage, shipping damage, installation errors, errors in instructions, customer misuse or other noise factors beyond the control of the designer.

11. A storage medium encoded with machine-readable computer program for applying design for reliability into design for Six Sigma, the storage medium including instructions for causing a computer to implement a method comprising:

establishing a model for reliability as a function of time;

determining a reliability transfer function;

calculating defects per opportunity per unit of time;

entering said defects per opportunity per unit of time into a calculation of value of sigma;

selecting one or more noise factors likely to have an impact on reliability; and performing a Monte Carlo simulation of said impact on reliability.

12. The medium of claim 11, wherein said transfer function is an exponential distribution.

13. The medium of claim 11, wherein said transfer function is a Weibull distribution.

14. The medium of claim 11, wherein said transfer function is a log-normal distribution.

15. The medium of claim 11, wherein a goal of defects per opportunity is entered as the calculated value of defects per opportunity per unit of time.

16. The medium of claim 11, wherein said noise factors include an assumption about time of use.

17. The medium of claim 11, wherein said noise factors include an assumption about manufacturing quality.

18. The medium of claim 11, wherein said noise factors include an assumption about ambient operating temperature.

19. The medium of claim 11, wherein said noise factors include an assumption about climatic conditions of use.

20. The medium of claim 11, wherein said noise factors may include one or more of assumptions of material quality, part quality, layout of components, extrinsic stresses, supplier quality, component preparation quality, component installation quality, system assembly quality, interconnection quality, test coverage, shipping damage, installation errors, errors in instructions, customer misuse or other noise factors beyond the control of the designer.

* * * * *